United States Patent [19]
Rathert et al.

[11] Patent Number: 5,469,954
[45] Date of Patent: Nov. 28, 1995

[54] CONVEYING APPARATUS WITH PRODUCT REORIENTATION CAPABILITY

[75] Inventors: Horst Rathert, Stiftsalle; Reimar Staudinger, Vorlaender, both of Germany

[73] Assignee: Kolbus GmbH & Co. KG, Rahden, Germany

[21] Appl. No.: 214,371

[22] Filed: Mar. 17, 1994

[30] Foreign Application Priority Data

Mar. 18, 1993 [DE] Germany ............ 43 08 601.2

[51] Int. Cl.⁶ .................................................. B65G 47/24
[52] U.S. Cl. ........................................... 198/412; 198/379
[58] Field of Search ..................... 198/374, 375, 198/376, 379, 412, 414, 399, 398, 401

[56] References Cited

U.S. PATENT DOCUMENTS

| | | | |
|---|---|---|---|
| 3,595,370 | 7/1971 | Fujishiro | 198/374 |
| 3,710,955 | 1/1973 | Redman et al. | 198/374 X |
| 4,299,076 | 11/1981 | Humphrey | 198/412 X |
| 4,494,645 | 1/1985 | Hessling et al. | |
| 4,519,493 | 5/1985 | Dyer. | |
| 4,798,278 | 1/1989 | Cornaccria | 198/399 |
| 4,928,807 | 5/1990 | Auerbach. | |
| 5,009,305 | 4/1991 | Auld et al. | 198/399 X |

FOREIGN PATENT DOCUMENTS

| | | |
|---|---|---|
| 0487841 | 9/1991 | European Pat. Off. ............. /3614202 |
| 2205153 | 8/1973 | Germany. |
| 2343856 | 3/1975 | Germany. |
| 2935263 | 3/1980 | Germany. |
| 2942748 | 4/1981 | Germany. |
| 3214457 | 10/1983 | Germany. |
| 3321584 | 12/1984 | Germany. |
| 3321583 | 12/1984 | Germany. |
| 3614202 | 10/1987 | Germany. |
| 4127207 | 2/1993 | Germany. |
| 2242178 | 9/1991 | United Kingdom. |

*Primary Examiner*—James R. Bidwell
*Attorney, Agent, or Firm*—Chilton, Alex & Van Kirk

[57] ABSTRACT

Printing works products, book blocks having a spine for example, are transferred from a feed conveyor to a receiver with selected products being rotated through an angle of 180° during the transfer. The products to be rotated are frictionally engaged, slowed to a standstill during a first phase of rotation and thereafter accelerated and discharged when rotation is completed. The synchronized first phase of rotation and arresting of product motion is controlled such that the center of gravity of the product will be located approximately in alignment with the axis of rotation when rotation through an angle of approximately 90° is completed.

21 Claims, 1 Drawing Sheet

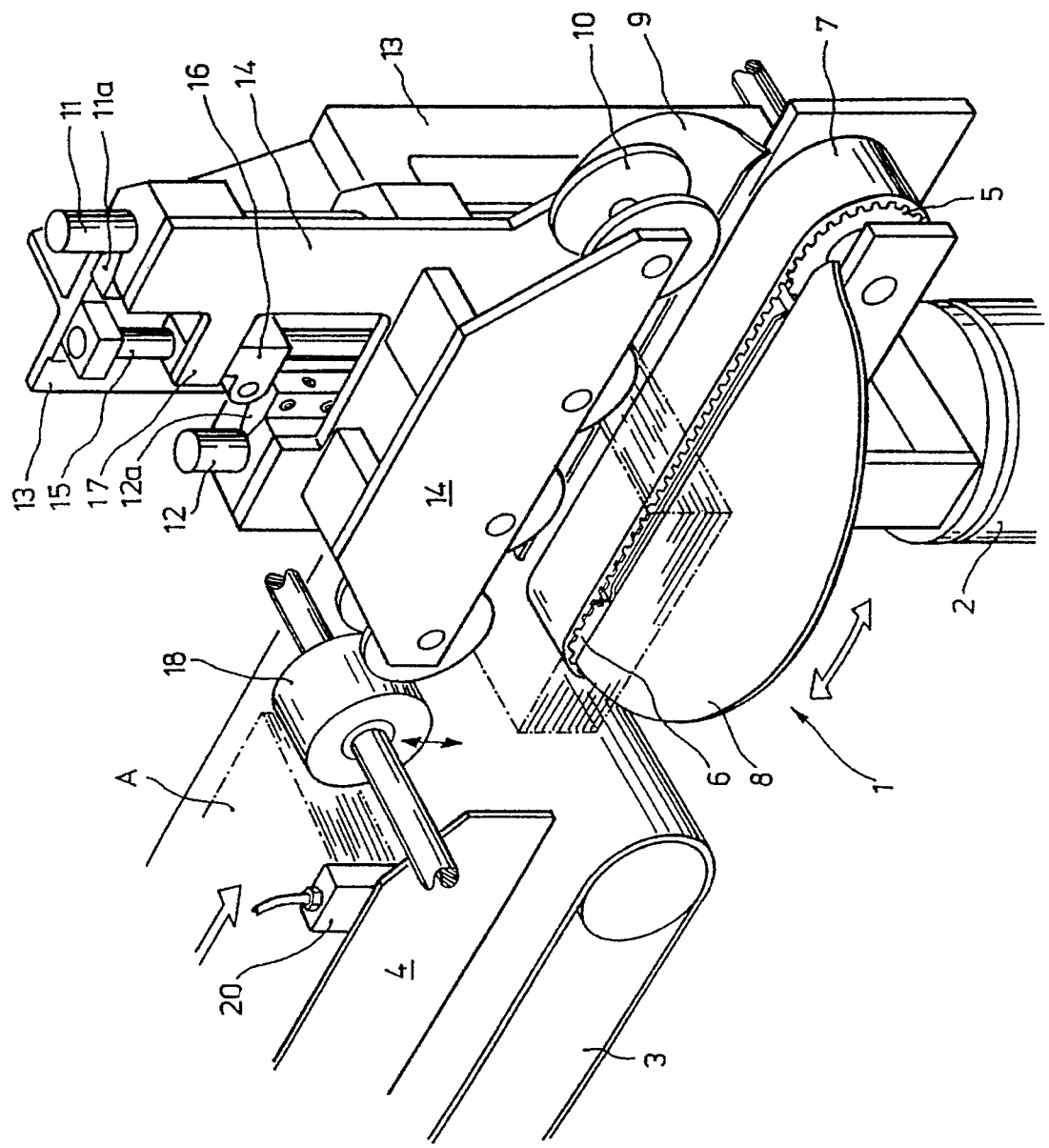

CONVEYING APPARATUS WITH PRODUCT REORIENTATION CAPABILITY

BACKGROUND OF THE INVENTION

1. Field of the Invention

The present invention relates to the transfer of unsymmetrical products between points wherein the product orientation may be selectively changed during such movement, and particularly to the conveying of printing works products in such a manner that alternate products moving in a conveying direction may be rotated by 180°. More specifically, this invention is directed to apparatus for selectively rotating printing works products, serially received on a conveyor, through an angle of 180° and especially to a conveyor having a rotation station which clamps and arrests the movement of incoming products, imparts a desired rotation to the claimed products and thereafter accelerates the reoriented products in a conveying direction. Accordingly, the general objects of the present invention are to provide novel and improved methods and apparatus of such character.

2. Description of the Prior Art

While not limited thereto in its utility, the present invention is particularly well suited for use in connection with the manipulation, and particularly the stacking, of printing works products such as books, book blocks, brochures, stacks of sections of publications and stacks of book blocks. Printing works products of the types enumerated are characterized by a generally rectangular shape and a spine which extends along one edge. The spine region of such products is thicker than the oppositely disposed edge. Accordingly, in the stacking and palletizing of such printing works products, either individually or stack-by-stack, in order to compensate for spine slope and thus ensure stack stability, selective rotation of the products through an angle of 180° is required. Typically, in the formation of stacks of the enumerated printing works products, the formed stacks will be comprised of products which are alternately rotated by 180° relative to one another.

As an example of prior art apparatus for selectively rotating book blocks in the course of stacking the same, reference may be had to published German application No. 29 35 263. In the apparatus depicted in this published application, unbound book block sections are selectively rotated and then stacked. The apparatus for causing rotation is located between a feed conveyor and a discharge conveyor and is in the form of cooperating pairs of clamping plungers. These plunger pairs are associated with synchronized upper and lower conveyors. The plungers are spring biased so as to grip a product which is to be rotated in a central region thereof. The plungers are selectively rotatable through an angle of 180° during movement with the associated conveyors. The lower plungers operate through the conveyor on which the product to be rotated is supported, the lower conveyor consisting of spaced belts. Acting in response to a rotation-control, the apparatus of the published German application enables books or book blocks to be fed to a downstream stacking mechanism, individually or stack-by-stack, with the spines of alternate in-fed products pointing in opposite directions.

The rotation device of German Application No. 29 35 263, with its multiplicity of controlled plungers mounted on separate continuously circulating chain drives, is an exceedingly complex mechanism which is characterized by relatively high cost and by volumetric inefficiency. Furthermore, as a result of sychronization difficulties, the alignment of the axes of cooperating upper and lower plungers cannot be maintained over a long working life. A misalignment of the plungers can result in the alignment of individual, or stacked, books or book blocks being lost. Any such misalignment is especially troublesome when the printing works product being handled comprises book sections which have been stacked but not yet bound to one another.

A further deficiency of prior art devices for selectively imparting rotation to printing works products resides in the fact that the control mechanisms therefor are complicated and expensive. Such control mechanisms must regulate the in-feed of the products from a hold-back stop on a feed conveyor to the point where the product is acquired by the rotation device, and such regulation must be able to take into account the necessity of acquiring products of different size and ensuring that each product, regardless of its size, is gripped so that it will be rotated about its center of gravity.

SUMMARY OF THE INVENTION

The present invention overcomes the above-briefly discussed and other deficiencies and disadvantages of the prior art by providing a novel and improved conveying apparatus, having the capability of selectively reorienting unsymetrical products which are serially delivered thereto, which is characterized by a high cycle rate and reliable operation. The reliability of apparatus in accordance with the present invention, when employed to transport and rotate products such as books, book blocks, brochures, pre-stacked sections of publications and similar products, is achieved through an uncomplicated construction which has the further attribute of occupying the minimum floor space necessary to accomplish the desired function. The present invention also encompasses the process of manipulating printing works products which is implemented by the aforesaid novel conveying apparatus.

Apparatus in accordance with a preferred embodiment of the invention is in the form of a transfer device which may be located intermediate an upstream feed conveyor and a downstream stacking station or other receiver. A transfer device in accordance with the present invention receives and clamps serially received products and selectively rotates the clamped products through an angle of 180°. The clamping of the products to be transferred, and in selective cases rotated, is accomplished by means of a gripping mechanism which includes a controllable speed conveyor section. The speed of forward movement of a gripped product is reduced to a standstill during initial rotation. This synchronized rotation and slowing results in the center of gravity of the product being substantially in registration with the axis of rotation at a point in time when the product has been rotated through an angle of approximately 90°. At this point in the rotation, the linear movement of the product will have been terminated. When the product has been rotated through 180°, the conveyor will be reversed and the product will be accelerated into the downstream equipment. The exercise of control over the slowing, rotating and accelerating of the product, and thus over the slowing, rotation, reversal and acceleration of the conveyor section of the transfer device, is controlled in response to energizing signals provided by a sensor responsive to the presence of an in-coming product.

Apparatus in accordance with the present invention is, as noted above, characterized by compact construction and relative mechanical simplicity which reduces manufacturing cost. The apparatus employs only a single mechanism, which is not independently rotatable, for gripping the products and this single gripping mechanism forms part of a unitary rotation device. The apparatus of the present invention achieves a relatively high operational speed, i.e., a high cycle rate, as a consequence of the fact that product rotation commences at a time when the product to be rotated is still moving in a forward direction. The present invention also ensures that any initial alignment, i.e., stacking, is maintained because the products are frictionally engaged over substantially their entire upper and lower sides during the time the in-feed speed is reduced to zero and during the time the product is accelerated to the desired exit speed.

A particularly important feature of the present invention resides in the fact that the product speed reduction and rotation are coordinated such that the center of gravity of a product being rotated will be generally in registration with the axis of rotation of the gripping and rotation device when that device has been rotated through approximately 90°. This feature guarantees that a full 180° of rotation can be accomplished while operating at a high cycle rate while, at the same time, preserving the lateral alignment of the product.

BRIEF DESCRIPTION OF THE DRAWING

The present invention may be better understood, and its numerous objects and advantages will become apparent to those skilled in the art, by reference to the accompanying drawing which is a partial perspective view of the mechanical components of a preferred embodiment of the invention.

DESCRIPTION OF THE DISCLOSED EMBODIMENT

Apparatus in accordance with the invention, and disclosed in the drawing, is particularly well suited for selectively transferring books, book blocks, brochures, pre-stacked portions of publications, pre-stacked book blocks and similar products from an upstream feed conveyor to downstream apparatus having a receiving conveyor or the like. The products being transferred will be characterized by a lack of symmetry, and particularly by a pair of oppositely disposed side edge regions of different thickness or height. Such a lack of symmetry is exemplified by the spine region of a publication. The invention may selectively reorient the products being transferred and, particularly, rotate such products through an angle of 180°.

Referring to the drawing, a gripping conveyor in accordance with the present invention is indicated generally at 1. The gripping conveyor 1 is rotatable, as indicated by the double-ended arrow, about the axis of a vertical support shaft 2. The products A to be transferred by the gripping conveyor 1 are fed to gripping conveyor 1 on an upstream located belt conveyor 3. The vertical alignment of the in-coming products A, which may be pre-stacked printing works products, is ensured by a vertical stop rail 4 against which the products A bear during movement on conveyor 3. The incoming products A will be spaced, one from another, by any desired interval and, as will be obvious from the discussion below, that interval must be greater than a minimum interval.

The gripping conveyor 1 comprises a primary support frame 13. An endless conveyor, which includes reversing rollers 5 and 6 and a toothed belt 7, is mounted from frame 13. Belt 7 will be driven, by reversible drive means not shown, such that its speed may vary between synchronism with belt 3 and a standstill condition. Belt 7 extends along a longitudinal gap provided between a pair of semi-circular, lateral support plates 8, 9. The support plates 8, 9 are mechanically coupled in any suitable manner, to frame 13.

The gripping conveyor 1 further includes a plurality of rollers 10. The rollers 10 are rotatable about axles which are oriented perpendicularly with respect to belt 7. The rollers 10 are supported from a carrier 14 which, in turn, is mounted on and movable relative to the frame 13. The movements of carrier 14 relative to frame 13 are guided by means of vertical guide bars 11, 11a, 12 and 12a which are affixed to frame 13. The vertical movements of carrier 14 are limited by mechanical stops which are adjustably located on a guide bar 15 which is oriented parallel to the guide bars 11 and 12. Thus, the downward movement of carrier 14 will be limited by contact between an arm 17 which projects from carrier 14 and cooperates with the lower stop 16 on bar 15. The rollers 10 cooperate with the belt 7 and support plates 8, 9 to exert a frictional clamping force on a product A being transported. That clamping force is gravity related, i.e., the clamping results solely from the weight of the carrier 14 which is freely movable in the vertical direction.

The rollers 10 are not driven, i.e., rollers 10 are freely rotatable on their axles, in the disclosed embodiment of the invention. Accordingly, in order to ensure that the incoming product A will be delivered into the space between rollers 10 and belt 7, a driven pressure roller 18 is provided immediately upstream of the gripping conveyor 1. The driven pressure roller 18 may, as indicated by the double-ended arrow, be raised or lowered as a function of the dimensions of the product being transferred. The raising and lowering of roller 18, as well as its rotational speed, may be accomplished in synchronism with the exercise of control over belt 7 as will be described below. As an alternative, the rollers 10 can be driven in synchronism with the belt 7 and the pressure roller 18 eliminated.

In the disclosed embodiment of the invention, a sensor 20 is provided adjacent the downstream end of feed conveyor 3. Sensor 20 may, for example, be a photoelectric device which detects the leading edge of an incoming product A and generates a command signal. This command signal will institute the synchronized rotation of frame 13 and a programmed reduction of the speed of belt 7 to produce the mode of operation to be described below.

Rotation of frame 13 about the axis of shaft 2 commences when the incoming product A has moved forward sufficiently to be supported on the gripping conveyor 1. Once rotation has commenced, the circulation speed of belt 7 is reduced until the belt comes to a standstill. In the preferred mode of operation, the speed of belt 7 will be fully arrested when the gripping conveyor has rotated through an angle of 90°. At this time, the center of gravity of the product A will be located so as to be approximately in registration of the axis of rotation. The gripping conveyor 1 continues to rotate until it reaches the 180° position. When the full 180° of rotation is completed, the product A will be ejected from the gripping conveyor 1 at a "high" speed, i.e., in the typical case the product will be accelerated up to the speed of the feed conveyor 3. In order for the product to be discharged from the gripping conveyor 1, the direction of circulation of the belt 7 will be reversed relative to the direction of belt motion at the time the product A was delivered into the gripping conveyor 1. The speed and direction of motion of belt 7 will thus be such that the gripping conveyor will be ready to receive the following product A moving along feed conveyor 3. In a typical case, only every second product will be rotated, i.e., every second command signal from sensor 20 will cause the above-described operation of the gripping conveyor 1. Products which are not rotated will simply be passed through the gripping conveyor 1. Also in a typical installation, the frame 13 will be caused to alternately rotate in the clockwise and counter-clockwise directions although a single direction of rotation is possible.

As noted above, the reduction in the circulation speed of belt 7 is caused to commence and progress such that the center of gravity of the product A will be above the axis of rotation of shaft 2 when the frame 13 has been rotated through an angle of 90°. This mode of operation has been found to maximize the through-put of the gripping conveyor.

While a preferred embodiment has been shown and described, various modification and substitutions may be made thereto without departing from the spirit and scope of the invention. Accordingly, it is to be understood that the present invention has been described by way of illustration and not limitation.

What is claimed is:

1. Apparatus for transferring unsymmetrical products from a feed conveyor to a receiver, the products having oppositely disposed first and second sides, said apparatus comprising:

frame means rotatable about an axis;

variable speed linear conveyor means supported from said frame means, said conveyor means being in alignment with the conveying path of the feed conveyor at a first angular position of said frame means, said conveyor means engaging a first side of a product to be transferred and supporting the engaged product;

means mounted on said frame means for engaging the side of a product disposed opposite to the side supported on said conveyor means, said engagement means engaging the product as it is being transferred; and means for controlling said conveyor means and the rotation of said frame means such that the linear component of the motion of a product supported on said conveyor means and contracted by said engaging means is simultaneous with rotation of said frame means and will be fully arrested when the center of gravity of the product is approximately in registration with said axis of rotation of said frame means when said frame means has been rotated through an angle of approximately 90°, said controlling means further causing a reversal of said linear conveyor means to thereby permit the product to be delivered to the receiver after said frame means has been rotated through an angle of 180°.

2. The apparatus of claim 1 wherein said linear conveyor means is driven at an initial speed which is equal to the speed of the feed conveyor.

3. The apparatus of claim 1 wherein said linear conveyor means comprises an endless belt and wherein said engaging means comprises a carrier which is freely movable in a direction which is generally transverse to the product supporting surface of said belt, a plurality of freely rotatable product contacting rollers being supported from said carrier.

4. The apparatus of claim 2 wherein said linear conveyor means comprises an endless belt and wherein said engaging means comprises a carrier which is freely movable in a direction which is generally transverse to the product supporting surface of said belt, a plurality of freely rotatable product contacting rollers being supported from said carrier.

5. The apparatus of claim 3 further comprising means for limiting the movement of said carrier in the direction of said belt.

6. The apparatus of claim 4 further comprising means for limiting the movement of said carrier in the direction of said belt.

7. The apparatus of claim 1 further comprising:

a driven pressure roller positioned upstream of said linear conveyor means for driving products from the feed conveyor onto said linear conveyor means.

8. The apparatus of claim 3 further comprising:

a driven pressure roller positioned upstream of said linear conveyor means for driving products from the feed conveyor onto said linear conveyor means.

9. The apparatus of claim 4 further comprising:

a driven pressure roller positioned upstream of said linear conveyor means for driving products from the feed conveyor onto said linear conveyor means.

10. The apparatus of claim 6 further comprising:

a driven pressure roller positioned upstream of said linear conveyor means for driving products from the feed conveyor onto said linear conveyor means.

11. The apparatus of claim 3 wherein said linear conveyor means further comprises a pair of support plates positioned at opposite sides of said belt, said plates being substantially coplanar with the product supporting surface of said belt.

12. The apparatus of claim 3 wherein said belt is a toothed belt.

13. The apparatus of claim 4 wherein said linear conveyor means further comprises a pair of support plates positioned at opposite sides of said belt, said plates being substantially coplanar with the product supporting surface of said belt.

14. The apparatus of claim 11 wherein said belt is a toothed belt.

15. The apparatus of claim 13 wherein said belt is a toothed belt.

16. The apparatus of claim 15 further comprising means for limiting the movement of said carrier in the direction of said belt.

17. The apparatus of claim 16 further comprising:

a driven pressure roller positioned upstream of said linear conveyor means for driving products from the feed conveyor onto said linear conveyor means.

18. A method for transferring printing works products between a feed conveyor which defines a substantially linear conveying path and a receiver, the products having a leading edge and a trailing edge when moving on the feed conveyor, said method comprising the steps of:

intercepting products moving along the conveying path;

frictionally engaging a pair of opposite sides of the moving intercepted products;

reducing the linear velocity of selected of the engaged products;

imparting rotational motion to a selected product while the linear velocity thereof is being reduced whereby motion of the product will be momentarily arrested when the selected product has been rotated through an angle of approximately 90°;

continuing to rotate the selected product subsequent to the arresting of the motion thereof until the selected product has been rotated through an angle of approximately 180°; and accelerating the selected product during the continued rotation thereof to thereby cause the selected product to be delivered to the receiver when the selected product has been rotated through said angle of approximately 180° whereby the leading edge of the selected products will become the trailing edge thereof when the selected products are received on the receiver.

19. The method of claim 18 wherein printing works products received serially from the feed conveyor which are not selected for velocity reduction are permitted to pass to the receiver without rotation and wherein the motion of the selected products is fully arrested when the center of gravity of a selected product is approximately in registration with the axis about which the rotational motion of a selected product occurs.

20. The method of claim 19 further comprising the step of:

detecting the leading edge of products arriving on the feed conveyor and instituting the linear velocity reduction in response to such detection.

21. A conveying apparatus for selectively reorienting printing works products comprising a series of such products which are moving along a production line, the conveying apparatus being located intermediate a receiver and a feed conveyor which defines a feed path for the products, the products moving along the feed path with a first orientation defined by oppositely disposed leading and trailing edges, said conveying apparatus comprising:

gripping conveyor means for frictionally engaging products delivered thereto by the feed conveyor, said gripping conveyor means defining a linear motion path, said gripping conveyor means being controllable to vary the velocity and direction of motion of an engaged product along said defined linear motion path;

means for imparting rotation to said gripping conveyor means whereby the motion of a product engaged by said gripping conveyor means may selectively have linear and rotational components; and means for simultaneously controlling said rotation imparting means and said gripping conveyor means whereby the velocity of products selected for reorientation may be reduced to a standstill during motion along said gripping conveyor means defined linear path, said reduction in velocity occuring simultaneously with rotation of said conveyor means between a first angular position and a second angular position, said controlling means reversing said gripping conveyor means during the further rotation thereof between said second angular position and a third angular position whereby the selected products are accelerated from the standstill condition, said third angular position being displaced from said first angular position by approximately 180°, the leading edge of a selected product when moving on said feed conveyor thereby becoming the trailing edge of the selected product when delivered to the receiver.

* * * * *